United States Patent
Balin et al.

(10) Patent No.: US 12,462,048 B2
(45) Date of Patent: Nov. 4, 2025

(54) COMPUTING SYSTEMS AND METHODS PROVIDING SEGMENTED ENCRYPTION

(71) Applicant: Dell Products L.P., Round Rock, TX (US)

(72) Inventors: Maxim Balin, Gan-Yavne (IL); Roman Bober, Ashdod (IL); Doron Bokobza, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 123 days.

(21) Appl. No.: 18/524,140

(22) Filed: Nov. 30, 2023

(65) Prior Publication Data

US 2025/0181729 A1    Jun. 5, 2025

(51) Int. Cl.
    *G06F 21/00*      (2013.01)
    *G06F 21/60*      (2013.01)
    *G06F 21/62*      (2013.01)

(52) U.S. Cl.
    CPC ........ *G06F 21/602* (2013.01); *G06F 21/6227* (2013.01)

(58) Field of Classification Search
    CPC ........................... G06F 21/602; G06F 21/6227
    See application file for complete search history.

(56) References Cited

U.S. PATENT DOCUMENTS

| | | | | |
|---|---|---|---|---|
| 6,772,343 | B1 * | 8/2004 | Shimizu | H04L 9/0625 380/37 |
| 11,088,838 | B2 * | 8/2021 | Patel | H04L 9/0872 |
| 2002/0159598 | A1 * | 10/2002 | Rubinstein | H04L 9/0869 380/259 |
| 2004/0037292 | A1 * | 2/2004 | Gulati | G06F 13/4247 370/395.5 |
| 2015/0372807 | A1 * | 12/2015 | Khoyi | G06F 16/116 713/150 |
| 2017/0230338 | A1 * | 8/2017 | Loprieno | H04L 9/065 |
| 2022/0337391 | A1 * | 10/2022 | Sung | H04L 9/0618 |
| 2023/0078461 | A1 * | 3/2023 | Tanaka | H04L 45/121 713/160 |

* cited by examiner

*Primary Examiner* — Ghazal B Shehni
(74) *Attorney, Agent, or Firm* — Fogarty LLP

(57) ABSTRACT

Systems and methods support segmenting and encrypting a data object. For instance, a computing system may segment a data object into multiple chunks and then encrypt each of the chunks according to pseudo-randomly selected encryption algorithms. A result is that the data object has been split into multiple encrypted chunks, where the encrypted chunks have some amount of pseudo-randomness in their encryption.

20 Claims, 3 Drawing Sheets

---

200

201 — SEGMENTING A DATA OBJECT INTO A PLURALITY OF CHUNKS

202 — EMPLOYING A PSEUDORANDOM FUNCTION TO SELECT A FIRST ENCRYPTION ALGORITHM FOR A FIRST CHUNK OF THE PLURALITY OF CHUNKS AND A SECOND ENCRYPTION ALGORITHM FOR A SECOND CHUNK OF THE PLURALITY OF CHUNKS

203 — GENERATING A FIRST ENCRYPTED CHUNK AND A SECOND ENCRYPTED CHUNK

204 — STORING THE FIRST ENCRYPTED CHUNK AND THE SECOND ENCRYPTED CHUNK IN A DATA STORAGE SYSTEM

205 — STORING METADATA THAT IDENTIFIES LOCATIONS IN THE DATA STORAGE SYSTEM AT WHICH THE FIRST ENCRYPTED CHUNK AND THE SECOND ENCRYPTED CHUNK ARE STORED

206 — MAKING THE DATA OBJECT AVAILABLE FOR READ AND WRITE OPERATIONS

COMPUTING SYSTEMS AND METHODS PROVIDING SEGMENTED ENCRYPTION

FIELD

The present disclosure relates to computing security and, more particularly, to tools for segmenting and encrypting data in a computing system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Further, as the value and use of information continues to increase, so does the value of security. There is a need in the art for effective and efficient techniques for providing computing security.

SUMMARY

In various embodiments, a method includes: segmenting a data object into a plurality of chunks; employing a pseudorandom function to select a first encryption algorithm for a first chunk of the plurality of chunks and a second encryption algorithm for a second chunk of the plurality of chunks; generating a first encrypted chunk and a second encrypted chunk, including encrypting the first chunk according to the first encryption algorithm and encrypting the second chunk according to the second encryption algorithm; storing the first encrypted chunk and the second encrypted chunk in a data storage system; storing metadata that identifies locations in the data storage system at which the first encrypted chunk and the second encrypted chunk are stored, the metadata further identifying the first encryption algorithm and the second encryption algorithm; and subsequent to storing the first encrypted chunk and the second encrypted chunk, making the data object available for read and write operations.

In some embodiments, an IHS (Information Handling System) includes one or more processors; one or more memory devices coupled to the one or more processors, the one or more memory devices storing computer-readable instructions that, upon execution by the one or more processors, cause the IHS to: select, in a pseudorandom manner, a first encryption algorithm for a first chunk of a plurality of chunks of a data object and a second encryption algorithm for a second chunk of the plurality of chunks; generate a first encrypted chunk and a second encrypted chunk, including encrypting the first chunk according to the first encryption algorithm and encrypting the second chunk according to the second encryption algorithm; store the first encrypted chunk and the second encrypted chunk in a data storage system; and make the data object available for read and write operations after having stored the first encrypted chunk and the second encrypted chunk.

In some embodiments, a computer-readable storage device has instructions stored thereon for encrypting a data object, wherein execution of the instructions by one or more processors of an information handling system (IHS) causes the one or more processors to: select a first encryption algorithm for a first chunk of the plurality of chunks of a data object and a second encryption algorithm for a second chunk of the plurality of chunks, wherein the first encryption algorithm and the second encryption algorithm are selected according to a pseudorandom function; generate a first encrypted chunk and a second encrypted chunk, including encrypting the first chunk according to the first encryption algorithm and encrypting the second chunk according to the second encryption algorithm; store the first encrypted chunk and the second encrypted chunk in a data storage system; and subsequent to storing the first encrypted chunk and the second encrypted chunk, making the data object available for read and write operations.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
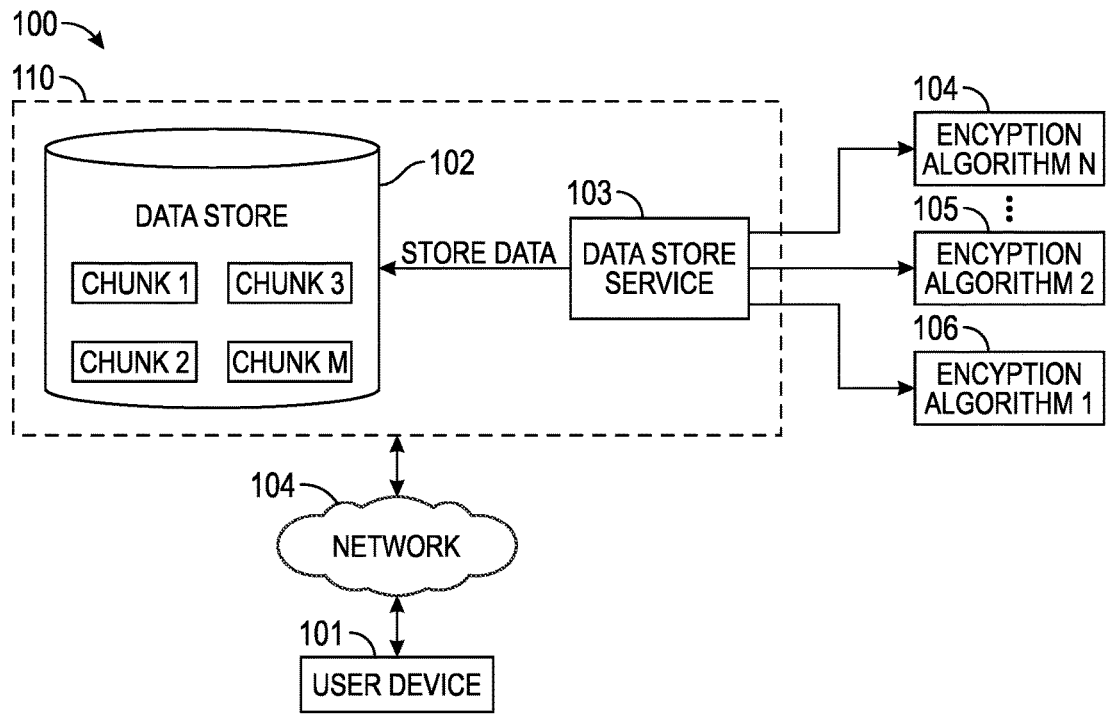
FIG. 1 is an illustration of an example information processing system, according to embodiments.

In the following description, numerous specific details are set forth in order to provide a thorough understanding of embodiments of the present disclosure. It will be apparent to one skilled in the art that embodiments of the present disclosure may be practiced without some of these specific details. Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). While embodiments of the present disclosure have been illustrated and described, the disclosure is not limited to these embodiments only. Numerous modifications, changes, variations, substitutions, and equivalents will be apparent to those skilled in the art, without departing from the scope of the disclosure, as described in the claims.

Various implementations seek to enhance data security for computing systems generally as well as in edge computing systems in particular. For instance, one implementation may secure sensitive data by dividing it into segments and encrypting each segment using a different encryption algorithm. The sensitive data may be first segmented into manageable portions. Each segment is then encrypted using a unique encryption algorithm. For instance, the different encryption algorithms may correspond to different encryption standards or may even use the same encryption standard but use different encryption keys. Examples of encryption standards that may be used include Triple Data Encryption Standard (DES), Rivest-Shamir-Adleman (RSA) Encryption, and Advanced Encryption Standards (AES).

The different encryption algorithms may create a scenario such that even if a malicious user were to crack one of the encryption algorithms for one of the segments, the remaining segments and their respective encryption algorithms may remain secure. In some examples, this multi-layered approach to encryption may reduce a risk of a security breach and further enhance the overall security of sensitive data.

One example method splits data into M segments and randomly assigns to each segment an encryption algorithm from N existing encryption algorithm options. In some examples, $M=<N$, although some other examples may adapt to $M>N$ by reusing some encryption algorithms over multiple segments. The mapping of the segments to their respective encryption algorithms and their data storage locations may be securely stored in safe key-value storage. An example of a safe key-value storage includes an identity-based secrets and encryption management system, such as a management system available under the brand name HASHICORP. However, the scope of implementations is not limited to any particular technique for storing mapping data or metadata.

Various implementations include splitting sensitive data into chunks. In some examples, an end user or customer may identify which data is sensitive. For instance, sensitive data may include a data object, such as a file, a database, a table of a database, a row or a field of a database, or the like. Generally, a data object may include something larger than a minimum size (e.g., larger than a 4K byte data block) and something smaller than a storage volume. The data object may be split into chunks, where the chunks should be greater than or equal to a defined minimum chunk size (e.g., larger than a 4K byte data block), and a quantity of chunks may be large enough to provide increased protection but small enough so as not to be overly burdensome or inefficient for the storage system to store. Chunk size and quantity of chunks may be set to be appropriate for a given application.

One example use case may include Internet of things (IOT) data transfer. For instance, an IOT device may transfer data to a central location, where the data is then split into chunks and encrypted before being sent over a less secure network. The splitting and encrypting may increase the security of the data, thereby making up for the less secure nature of the network.

Another example use case includes secure edge storage. Data that may be indicated as being particularly sensitive may be split and encrypted, thereby adding security to the data. Yet another example use case may include secure edge collaboration. For instance, in some cases, computing devices may be used to collaborate on sensitive data without sending the sensitive data to a central location. The data, where it is stored other than at the central location, may be split and encrypted, thereby providing an additional layer of security to the data as it is stored or, perhaps, transferred on a less secure network.

Various implementations may provide advantages over prior solutions. For instance, some other systems may encrypt data, but such other systems may use only a single encryption algorithm. By contrast, various implementations described herein use not only multiple data encryption algorithms on a single data object, but also may add pseudorandom selection of the encryption algorithms, thereby reducing a risk of a malicious user accessing the entirety of the data object.

Furthermore, various implementations may allow for flexibility in choosing encryption algorithms. For instance, some businesses or government entities may have specific requirements about data encryption. Various implementations may allow for data encryption algorithms, conforming to any specific requirements, to be identified and then added as options for pseudorandom selection, while omitting use of nonconforming algorithms.

FIG. 1 shows an example information processing system 100 configured in accordance with an example embodiment. Information processing system 100 includes data storage system 110 and user device 101. Storage system 110 may include any of a variety of different types of storage, such as network-attached storage (NAS), storage area networks (SANs), direct-attached storage (DAS) and distributed DAS, as well as combinations of these and other storage types, including software-defined storage.

User device 101 may include any appropriate computing device, for example, a server and/or portions of one or more server systems, as well a mobile telephone, laptop computer, tablet computer, desktop computer or the like. Such devices are examples of what are more generally referred to herein as "processing devices." Some of these processing devices are also generally referred to herein as "computers."

The information processing system 100 in some embodiments may include respective computers associated with a particular company, organization or other enterprise. In addition, at least portions of the processing system 100 may also be referred to herein as collectively including an "enterprise network." Numerous other operating scenarios involving a wide variety of different types and arrangements of processing devices and networks are possible.

Data storage system 110 and user device 101 may both be coupled to network 104 for communication. The network 104 may include a portion of a global computer network such as the Internet, although other types of networks may be part of the computer network 100, including a wide area network (WAN), a local area network (LAN), a satellite network, a telephone or cable network, a cellular network, a wireless network such as a Wi-Fi or 5G network, or various portions or combinations of these and other types of networks. The computer network 104 in some embodiments therefore may include combinations of multiple different types of networks, each including processing devices configured to communicate using internet protocol (IP) or other related communication protocols.

Also associated with the user device 101 are one or more input-output devices, which may include keyboards, displays or other types of input-output devices in any combination. Such input-output devices may be used, for example, to support one or more user interfaces to the user device 101, as well as to support communication between the user device 101 and other related systems and devices not explicitly shown. One or more input-output devices may also be associated with the data storage system 110.

Additionally, the user device 101 in the FIG. 1 embodiment may be implemented using at least one processing device. Each such processing device may include at least one processor and an associated memory and may implement one or more functional modules for controlling certain features of the user device 101. Data storage system 110 may also be implemented using one or more processing devices.

More particularly, each of the processing devices embodying the user device 101 and the data storage system 110 may include a processor coupled to a memory and a network interface. The processor may include any appropriate processing circuit, such as a microprocessor, a microcontroller, an application-specific integrated circuit (ASIC), a field-programmable gate array (FPGA) or other type of processing circuitry, as well as portions or combinations of such circuitry elements.

The memory may include random access memory (RAM), read-only memory (ROM) or other types of memory, in any combination. The memory and other memories disclosed herein may be viewed as examples of what are more generally referred to as "computer-readable storage media" storing executable computer program code or other types of software programs.

One or more embodiments may include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited to spinning magnetic media.

Each of the data storage system 110 and the user device 101 may include a network interface device (not shown). Network interfaces allow the user device 101 to communicate over the network 104 with the data storage system 110, and perhaps other devices (not shown), and may include one or more transceivers.

The data storage system 110 includes a data store 102 and a data store service 103. Although not shown explicitly, data store service 103 may be implemented as part of a storage controller or other similar utility. An example storage controller may include a processing device running an operating system, such as a storage operating system, and providing functionality to save, store, and manipulate data in the data store 102. The data store 102 may include a storage drive or multiple storage drives in an array. The data store service 103 may be implemented at least in part in the form of software that is stored in memory and executed by a processor in any processing device of the data storage system 110. The data store service 103 may be a standalone plugin that may be included within a processing device, may be its own application, or may be implemented in any other appropriate manner.

The data store service 103 may be configured to provide data object splitting and encryption, such as described in more detail below with respect to FIGS. 2-4. For instance, data store service 103 may be configured to receive a data object, e.g., in a write request and to split and encrypt that data object. In one example, the data store service 103 may pseudo-randomly assign individual ones of encryption algorithms 104-106 to the chunks resulting from splitting the data object.

In one implementation, data store service 103 may then store the encrypted chunks at data store 102 according to any storage technology. For instance, data storage system 110 may use a redundant array of independent disks (RAID) technology or other appropriate technology to store the encrypted data chunks. In this example, encrypted data chunks are illustrated as chunks 1-M in data store 102. Data store service 103 may also make the encrypted data chunks available for read and write access. For example, data store service 103 may store metadata indicating locations within data storage system 110 at which of the encrypted data chunks are stored. The metadata may also include indications of which storage algorithms were used to encrypt the data chunks, hashes of the data, and the like. The data store service 103 may then use that metadata to locate, access, encrypt or decrypt, or perform other appropriate functions in service of a read or write request.

Furthermore, the data store service 103 may provide for policies regarding which data to split and encrypt. For instance, data store service 103 may communicate with user device 101 so that user device 101 may present a user interface for the user to set storage policies. The storage policies may then be implemented by data store service 103. For instance, a user of user device 101 may indicate which data should be subject to splitting and encrypting, and data store service 103 may use that indication to create an executable policy. Data store service 103 may then execute that policy as the identified data is written, read, or modified.

Figure 2:
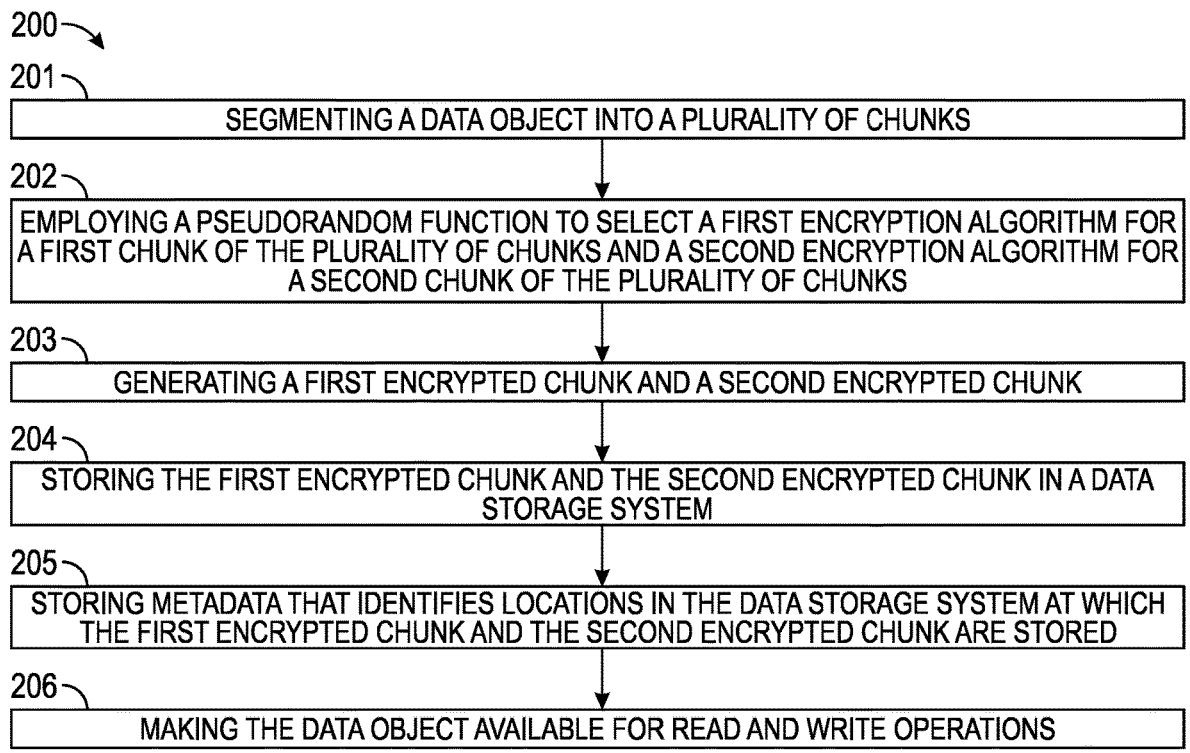
FIG. 2 is a flowchart describing certain steps of a method, according to embodiments, for data object encryption.

FIG. 2 is an illustration of an example method 200 for splitting and encrypting data, according to one embodiment. The actions of method 200 may be performed by a computing device as it executes computer-readable instructions to provide the functionality of a software component or an application. For example, a computing device, executing computer-readable instructions to provide the functionality of data store service 103, may perform the actions of method 200. FIG. 2 is described in context with FIG. 3, which is an illustration of an example data object being split into chunks, according to one embodiment.

At action 201, the computing device segments a data object into a plurality of chunks. An example is provided at FIG. 3, which illustrates data object 301. As noted above, examples of data objects may include files, databases, tables of databases, rows of databases, and the like. Furthermore, in this example, data object 301 may be associated with an identifier, such as a file name, file path, file offset, file mount location, database name, table name, row name, or the like.

Figure 3:
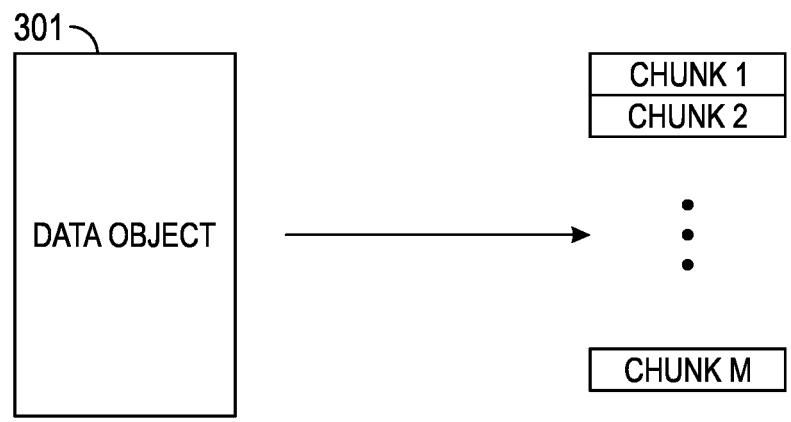
FIG. 3 is an illustration of splitting the data object into multiple chunks, according to embodiments.

In the example of FIG. 3, the computing device may segment data object 301 into multiple chunks. As noted above, a chunk size may be larger than a minimum storage size (e.g., larger than a 4K storage block) but smaller than the data object 301. The number of chunks in this example is M, which is an integer larger than 1. The quantity M of chunks may be set by the user or set by the computing system to be an appropriate number. Furthermore, segmenting data object 301 may include making each of the chunks roughly equal in size. However, some implementations may include segmenting data object 301 into unevenly-sized chunks. Also, segmenting data object 301 may include logically designating portions of data object 301 to correspond to each of the chunks 1 to M.

Although not specifically shown in method 200, the computing device may provide a user interface (UI) for a user to identify data objects to be split and encrypted. For instance, a user may employ the UI to identify a file by its filename or path or a database or part of a database by its respective identifier. The computing system may then receive the user input and mark the data object as a data object to be split and encrypted.

Furthermore, the data object may correspond to more sensitive data. Examples of more sensitive data may include personal identifying information, financial information, medical information, trade secret information, and the like. However, the scope of implementations is not limited to any particular type of sensitive information.

At action 202, the computing device may employ a pseudorandom function to select a first encryption algorithm for a first chunk of the plurality of chunks and a second encryption algorithm for a second chunk of the plurality of chunks. A result of action 202 is action 203, which includes generating a first encrypted chunk and a second encrypted chunk according to the selected encryption algorithms of action 202.

Figure 4:
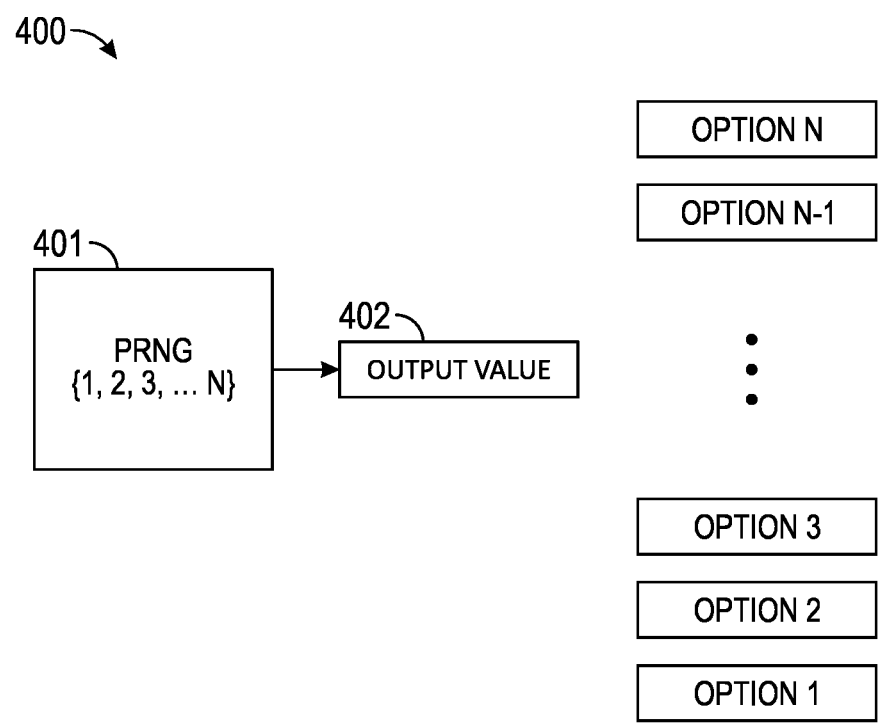
FIG. 4 is an illustration of an example method for selecting encryption algorithms for data chunks, according to embodiments.

FIG. 4 is an illustration of an example method 400 of selecting an encryption algorithm for a chunk, according to one embodiment. In method 400, pseudorandom number generator (PRNG) 401 is programmed to select from a set of numbers from 1 to N, inclusive. In this example, N is an integer greater than 1 and, in some examples, is greater than M. The integer N is set to represent a quantity of available options for encryption. PRNG 401 is configured to generate an output value 402, where the output value 402 corresponds to one of the options. For instance, if PRNG 401 generates an output value of three, then the computing device is configured to select Option 3.

Furthermore, in the context of action 202, the example method 400 may perform as many selections as there are chunks (i.e., M) to assign a respective encryption algorithm to each of the chunks. In some instances, method 400 may be configured so that when a particular output value is generated, that output value is retired for the purposes of a particular set of M selections. In such an example, each of the M chunks would be expected to have a different encryption algorithm. However, in other examples, method 400 may be configured so that a given output value may be repeated within a particular set of M selections. For instance, in a scenario in which M is larger than N, it may be desirable to allow some values to be repeated so that each chunk may be assigned an encryption algorithm, even if some encryption algorithms are repeated within the set of chunks.

Returning to FIG. 2, actions 202 and 203 include selecting encryption algorithms and generating encrypted chunks. While FIG. 2 refers to a first chunk and a second chunk, it is understood that each of the M chunks is assigned an encryption algorithm and that the computing system generates corresponding encrypted chunks (i.e., M chunks).

At action 204, the computing system stores the first encrypted chunk and the second encrypted chunk in a data storage system. The data storage system may include a network attached storage (NAS), a storage area network (SAN), or any other appropriate data storage system. An example of a data storage system is data storage system 110 of FIG. 1. In fact, action 204 includes storing each of the M chunks to the data storage system.

At action 205, the computing system stores metadata that identifies locations in the data storage system at which the encrypted chunks are stored. For instance, the metadata may include logical addresses and/or physical addresses that identify data storage locations. The metadata may also include any appropriate metadata that may be useful in identifying, encrypting, and decrypting the data object 301. Further examples of metadata may include an identifier of the data object 301 itself so that each of the M encrypted chunks may be associated with the data object 301. The metadata may also include identifications of the particular encryption algorithms for each of the M encrypted chunks. Further examples of metadata may include a hash, either of the data object 301, or individual hashes for each of the M chunks. A hash may be used to verify the integrity of the data object during a subsequent read or write operation. The metadata may be stored at any appropriate location. For instance, in some implementations, the metadata may be stored in nonvolatile RAM at the data store service 103. In any event, the metadata is stored so that a storage controller may search and access the metadata, perhaps using an identifier of the data object 301 as a key, to determine storage locations of the M chunks.

At action 206, the computing system makes the data object available for read and write operations. For instance, the computing system may present the data object to an application as it would any other data object, at least from the perspective of the application.

In one example, making the data object available includes receiving a read or write request from an application for the data object. The computing system may then use the metadata, as described above with respect to action 205, to identify the locations in the data storage system of the encrypted chunks. The computing system may also identify the first encryption algorithm and the second encryption algorithm, according to the metadata. The computing system may further decrypt the data object, such as by decrypting the first encrypted chunk and the second encrypted chunk via the first encryption algorithm and the second encryption algorithm, respectively.

Furthermore, the computer system may decrypt the data object according to a permission of a user associated with the read or write request. For instance, if the user has a permission that allows the user to access the data object, then access may be granted. However, if the user is not permitted to access the data object, then action 206 may include not providing access to that particular user, while other allowed users may be granted access. Action 206 may include an application modifying or deleting the data object.

Illustrative embodiments of processing platforms will now be described in greater detail with reference to FIGS. 5 and 6. For instance, FIGS. 5 and 6 illustrate example processing platforms on which any of the processing devices of FIG. 1 may be implemented; also, FIGS. 5 and 6 illustrate example processing platforms on which an application, such as data store service 103 of FIG. 1, may be run.

Figure 5:
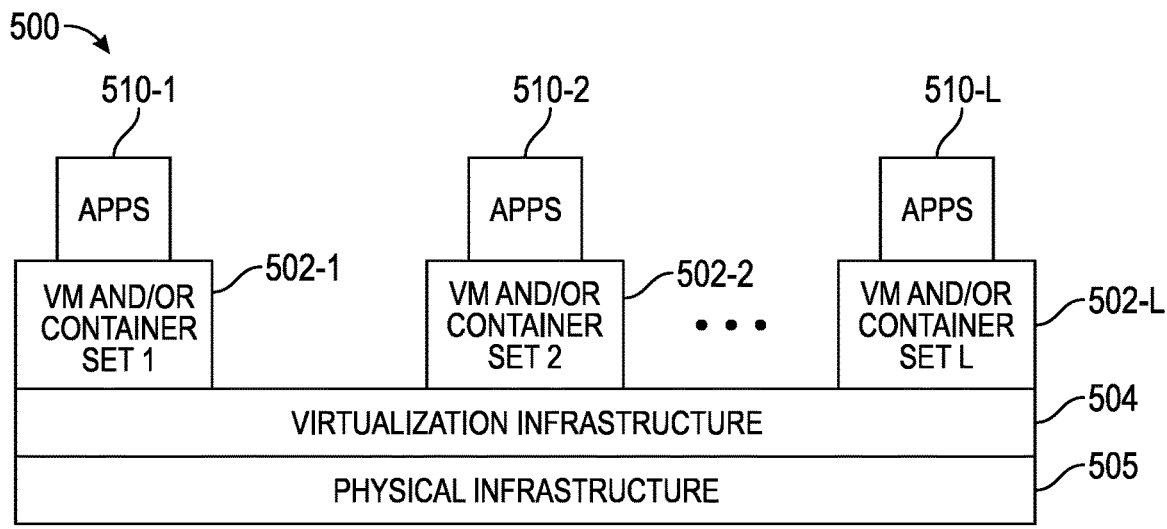
FIG. 5 is an illustration of an example processing platform that may be utilized in some embodiments.
Figure 6:
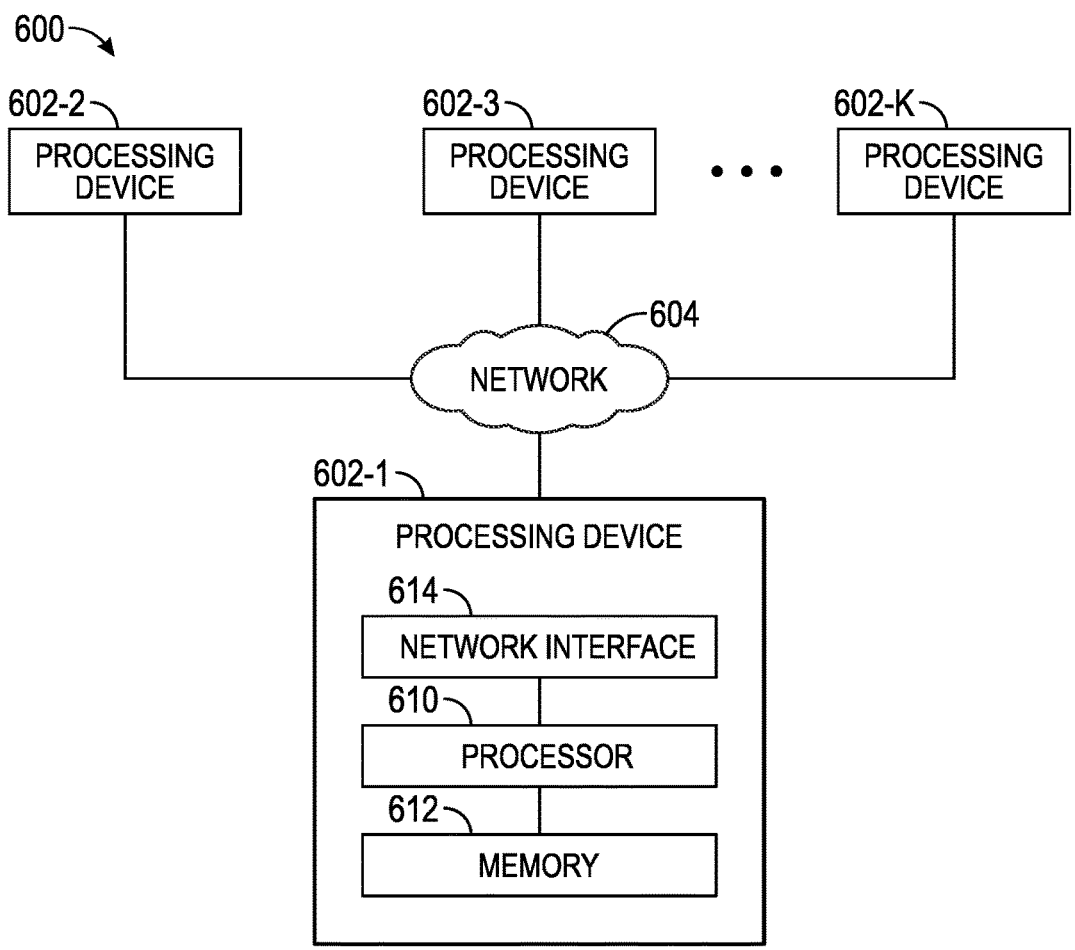
FIG. 6 is an illustration of an example processing platform that may be utilized in some embodiments.

FIG. 5 shows an example processing platform including cloud infrastructure 500. The cloud infrastructure 500 includes a combination of physical and virtual processing resources that are utilized to implement at least a portion of the information processing system 100. The cloud infrastructure 500 may include multiple virtual machines (VMs) and/or container sets 502-1, 502-2, . . . 502-L implemented using virtualization infrastructure 504. The virtualization infrastructure 504 runs on physical infrastructure 505 and may include one or more hypervisors and/or operating system-level virtualization infrastructure. The operating system-level virtualization infrastructure may include kernel control groups of a Linux operating system or other type of operating system.

The cloud infrastructure 500 further may include sets of applications 510-1, 510-2, . . . 510-L running on respective ones of the VMs/container sets 502-1, 502-2, . . . 502-L under the control of the virtualization infrastructure 504. In one example, a given one of the applications 510 may correspond to an application that accesses a data object such as data object 301. Furthermore, a given one of the applications 510 may correspond to data store service 103 and/or to storage controller functionality of data storage system 110.

The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that may include at least one hypervisor.

A hypervisor platform may be used to implement a hypervisor within the virtualization infrastructure 504, where the hypervisor platform has an associated virtual infrastructure management system. The underlying physical machines may include one or more distributed processing platforms that include one or more storage systems.

In other implementations of the FIG. 5 embodiment, the VMs/container sets 502 include respective containers implemented using virtualization infrastructure 504 that provides operating system level virtualization functionality, such as support for containers running on bare metal hosts, or containers running on VMs. The containers may be implemented using respective kernel control groups of the operating system.

One or more of the processing modules or other components of an information processing system may each run on a computer, server, storage device or other processing platform element. A given such element is viewed as an example of a computing device. The cloud infrastructure 500 shown in FIG. 5 may represent at least a portion of one processing platform. Another example of such a processing platform is processing platform 600 shown in FIG. 6.

The processing platform 600 in this embodiment may include a portion of the information processing system 100 and includes a plurality of processing devices, denoted 602-1, 602-2, 602-3, . . . 602-K, which communicate with one another over a network 604. For instance, user device 101 may be implemented as a processing device 602, as may one or more computing devices implementing data store service 103 and/or data controller functionality of the data storage system 110. Furthermore, user device 101 may be communicatively coupled to the data storage system 110 over network 104 in the same way that computing devices 602 are coupled over the network 604.

The network 604 may include any type of network, including by way of example a global computer network such as the Internet, a WAN, a LAN, a satellite network, a telephone or cable network, a cellular network, a wireless network such as a Wi-Fi or 5G network, or various portions or combinations of these and other types of networks.

The processing device 602-1 in the processing platform 600 may include a processor 610 coupled to a memory 612. The processor 610 may include a microprocessor, a microcontroller, an application-specific integrated circuit (ASIC), a field-programmable gate array (FPGA) or other type of processing circuitry, as well as portions or combinations of such circuitry elements.

The memory 612 may include random access memory (RAM), read-only memory (ROM) or other types of memory, in any combination. The memory 612 and other memories disclosed herein should be viewed as illustrative examples of processor-readable storage media or computer-readable media storing executable program code (e.g., computer-readable instructions) of one or more software programs.

Articles of manufacture including such processor-readable storage media are considered illustrative embodiments. A given such article of manufacture may include, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products including processor-readable storage media can be used.

Also included in the processing device 602-1 is network interface circuitry 614, which is used to interface the processing device with the network 604 and other system components and may include conventional transceivers.

The other processing devices 602 of the processing platform 600 are assumed to be configured in a manner similar to that shown for processing device 602-1. Each of the processing devices 602 is an example of an information handling system (IHS). Information handling systems may include any of a variety of devices, such as servers, personal computers, smart phones, and the like. Any of the processing devices 602 may be configured to execute computer-readable instructions to perform actions of the application development pipeline and/or actions associated with FIGS. 2-4.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the implementation(s) described herein embrace all such modifications and changes and, accordingly, the above description should be regarded in an illustrative rather than a restrictive sense.

Although the implementation(s) is/are described herein with reference to specific embodiments, various modifications and changes can be made without departing from the scope of the present implementation(s), as set forth in the claims below. Accordingly, the specification and figures are to be regarded in an illustrative rather than a restrictive sense, and all such modifications are intended to be included within the scope of the present implementation(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises"

and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method comprising:
segmenting a data object into a plurality of chunks;
employing a pseudorandom function to select a first encryption algorithm for a first chunk of the plurality of chunks and a second encryption algorithm for a second chunk of the plurality of chunks;
generating a first encrypted chunk and a second encrypted chunk, including encrypting the first chunk according to the first encryption algorithm and encrypting the second chunk according to the second encryption algorithm;
storing the first encrypted chunk and the second encrypted chunk in a data storage system;
storing metadata that identifies locations in the data storage system at which the first encrypted chunk and the second encrypted chunk are stored, the metadata further identifying the first encryption algorithm and the second encryption algorithm; and
subsequent to storing the first encrypted chunk and the second encrypted chunk, making the data object available for read and write operations, including:
receiving a read or write request for the data object;
identifying the locations in the data storage system, according to the metadata;
identifying the first encryption algorithm and the second encryption algorithm, according to the metadata; and
decrypting the data object, including decrypting the first encrypted chunk and the second encrypted chunk via the first encryption algorithm and the second encryption algorithm, respectively, and according to a permission of a user associated with the read or write request.

2. The method of claim 1, wherein the plurality of chunks are of a same size.

3. The method of claim 1, further comprising:
receiving input from the user, the input instructing the data object to be encrypted.

4. The method of claim 1, further comprising:
generating a hash of the data object; and
storing the hash with the metadata.

5. The method of claim 4, further comprising:
verifying the data object according to the hash.

6. The method of claim 1, wherein the first encryption algorithm and the second encryption algorithm conform to a same encryption standard and use different encryption keys.

7. The method of claim 1, wherein the first encryption algorithm and the second encryption algorithm conform to a same encryption standard and use keys of different lengths.

8. The method of claim 1, wherein the first encryption algorithm and the second encryption algorithm conform to different encryption standards.

9. The method of claim 1, wherein the data object comprises at least one item selected from a list consisting of:
a file;
a database;
a table of a database; and
a row or a field of a database.

10. An IHS (Information Handling System) comprising:
one or more processors;
one or more memory devices coupled to the one or more processors, the one or more memory devices storing computer-readable instructions that, upon execution by the one or more processors, cause the IHS to:
select, in a pseudorandom manner, a first encryption algorithm for a first chunk of a plurality of chunks of a data object and a second encryption algorithm for a second chunk of the plurality of chunks;
generate a first encrypted chunk and a second encrypted chunk, including encrypting the first chunk according to the first encryption algorithm and encrypting the second chunk according to the second encryption algorithm;
store the first encrypted chunk and the second encrypted chunk in a data storage system;
store metadata that identifies locations in the data storage system at which the first encrypted chunk and the second encrypted chunk are stored, the metadata further identifying the first encrypted chunk and the second encrypted chunk as corresponding to the data object; and
make the data object available for read and write operations after having stored the first encrypted chunk and the second encrypted chunk, including:
receive a read or write request for the data object;
identify the locations in the data storage system, according to the metadata;
identify the first encryption algorithm and the second encryption algorithm, according to the metadata; and
decrypt the data object, including decrypting the first encrypted chunk and the second encrypted chunk via the first encryption algorithm and the second encryption algorithm, respectively and according to a permission of a user associated with the read or write request.

11. The IHS of claim 10, wherein the computer-readable instructions to cause the IHS to store the first encrypted chunk and the second encrypted chunk comprises computer-readable instructions to cause the IHS to:
store the first encrypted chunk and the second encrypted chunk as chunks of a same size.

12. The IHS of claim 10, further comprising computer-readable instructions to cause the IHS to:
generate a hash of the data object;
store the hash with the metadata; and
verify the data object according to the hash.

13. The IHS of claim 10, wherein the first encryption algorithm and the second encryption algorithm conform to a same encryption standard and use different encryption keys.

14. The IHS of claim 10, wherein the first encryption algorithm and the second encryption algorithm conform to different encryption standards.

15. The IHS of claim 10, wherein the data object comprises at least one item selected from a list consisting of:
a file;
a database;
a table of a database; and
a row or a field of a database.

16. The IHS of claim 10, wherein the first encryption algorithm and the second encryption algorithm conform to a same encryption standard and use keys of different lengths.

17. A computer-readable storage device having instructions stored thereon for encrypting a data object, wherein execution of the instructions by one or more processors of an information handling system (IHS) causes the one or more processors to:
- select a first encryption algorithm for a first chunk of the plurality of chunks of a data object and a second encryption algorithm for a second chunk of the plurality of chunks, wherein the first encryption algorithm and the second encryption algorithm are selected according to a pseudorandom function;
- generate a first encrypted chunk and a second encrypted chunk, including encrypting the first chunk according to the first encryption algorithm and encrypting the second chunk according to the second encryption algorithm;
- store the first encrypted chunk and the second encrypted chunk in a data storage system;
- store metadata that identifies locations in the data storage system at which the first encrypted chunk and the second encrypted chunk are stored, the metadata further identifying the first encryption algorithm and the second encryption algorithm; and
- subsequent to storing the first encrypted chunk and the second encrypted chunk, making the data object available for read and write operations, including:
  - receive a read or write request for the data object;
  - identify the locations in the data storage system, according to the metadata;
  - identify the first encryption algorithm and the second encryption algorithm, according to the metadata; and
  - decrypt the data object, including decrypting the first encrypted chunk and the second encrypted chunk via the first encryption algorithm and the second encryption algorithm, respectively, and according to a permission of a user associated with the read or write request.

18. The computer-readable storage device of claim 17, further comprising instructions to cause the one or more processors to:
- receive input from the user, the input identifying the data object as being sensitive.

19. The computer-readable storage device of claim 17, wherein the data object comprises at least one item selected from a list consisting of:
- a file;
- a database;
- a table of a database; and
- a row or a field of a database.

20. The computer-readable storage device of claim 17, wherein the first encryption algorithm and the second encryption algorithm conform to different encryption standards.

* * * * *